Oct. 1, 1963  A. W. WEEMS  3,105,532
NUTCRACKER
Filed June 11, 1962  2 Sheets-Sheet 1
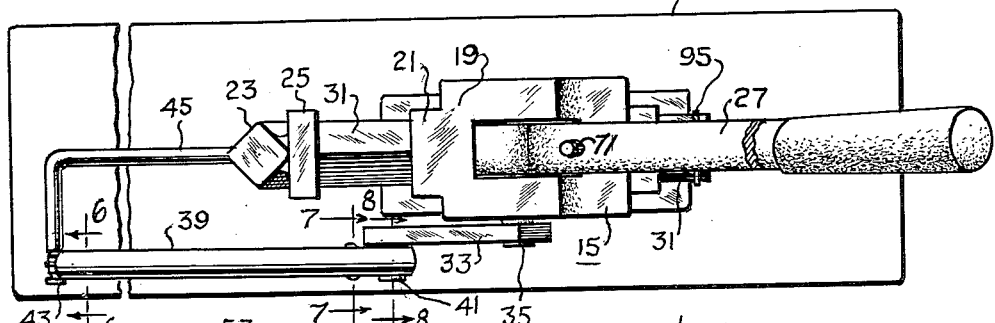
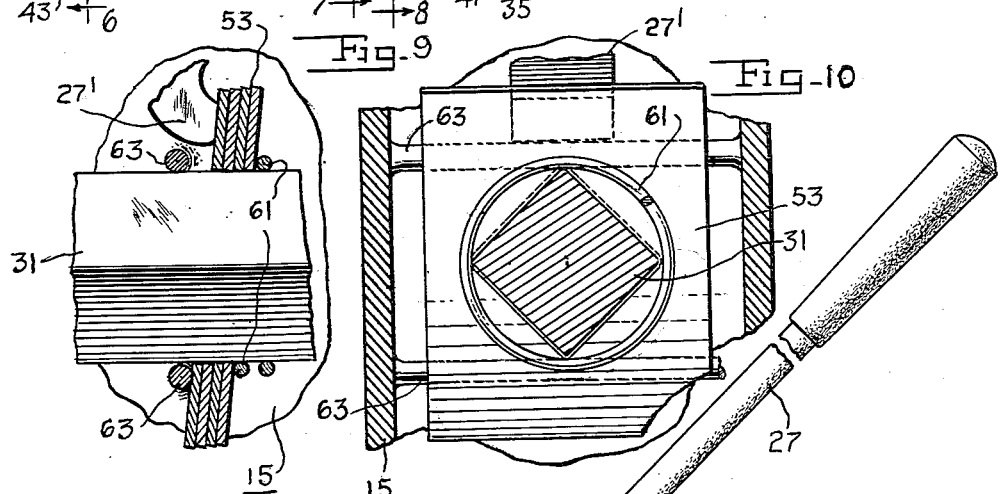
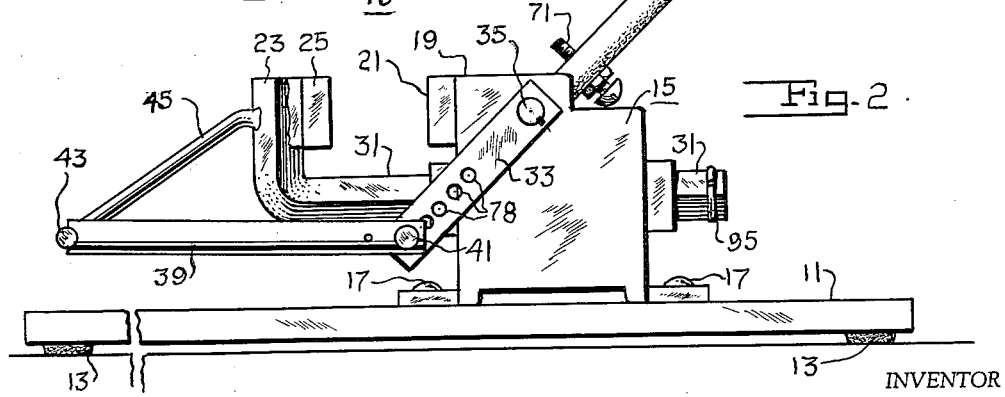
INVENTOR
Albert W. Weems
BY Fisher, Christen, Sabol and Caldwell,
ATTORNEYS

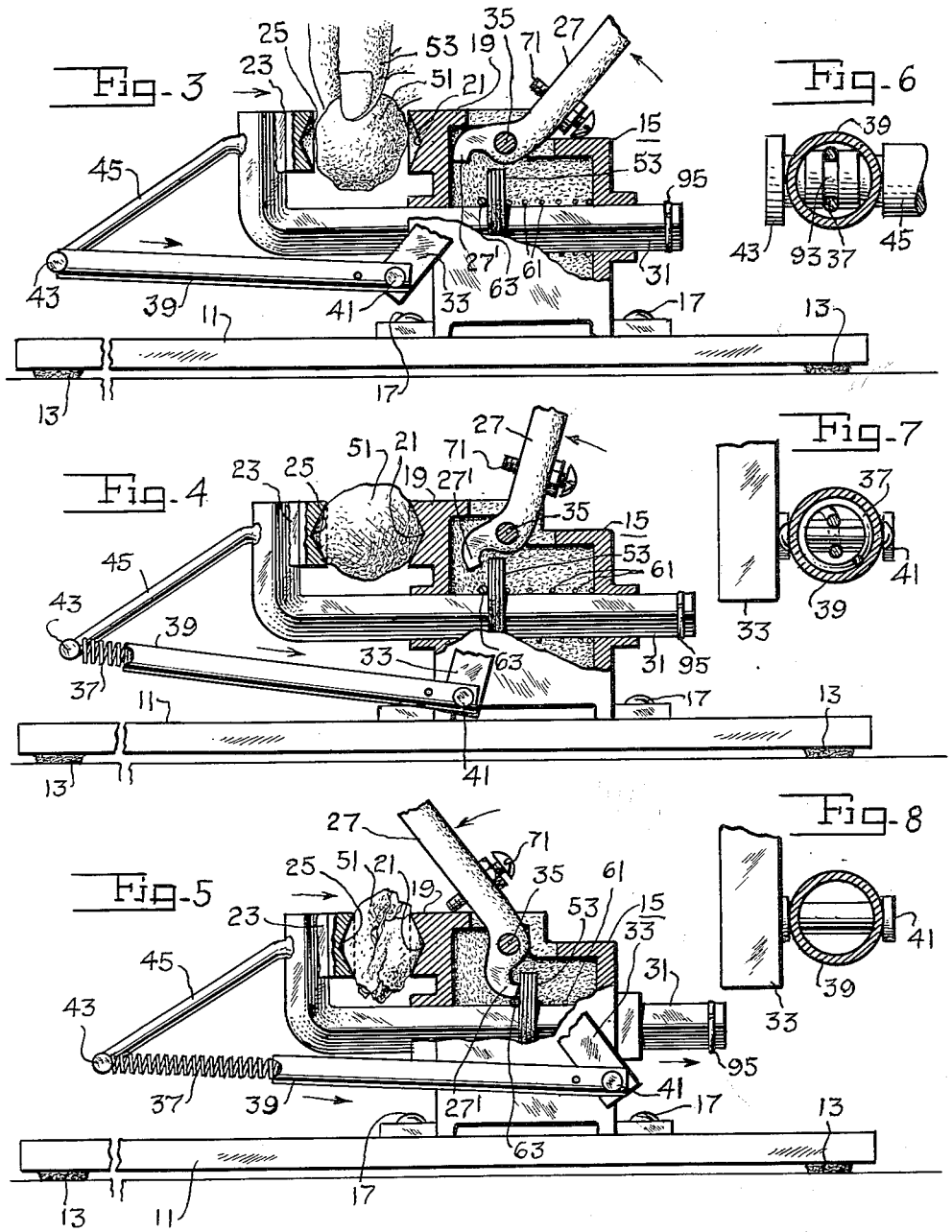

United States Patent Office
3,105,532
Patented Oct. 1, 1963

3,105,532
NUTCRACKER
Albert W. Weems, 1801 28th Ave., Meridian, Miss.
Filed June 11, 1962, Ser. No. 201,399
4 Claims. (Cl. 146—16)

The present invention relates primarily to nutcracking apparatus and particularly to a type nutcracker capable of providing control and adjustments of the nut-gripping and cracking pressures and the point of application of each in a nut-cracking cycle.

The nutcracker herein illustrated comprises a frame which supports a pair of opposed jaws, one fixed and the other movable relative thereto. The jaws are in the shape of aligned nut-receiving sockets with the movable one supported on a shaft adapted for longitudinal movement to carry it toward and away from the fixed jaw. A manually operable driving crank or lever is provided for imparting longitudinal movement to the shaft carrying the movable jaw. Its forward or jaw-closing stroke includes a resilient drive portion (primarily provided for gripping the nut) and a positive drive portion for increasing the pressure sufficient for cracking the shell.

The control available with the nutcracker of the present invention is such that the nut shell is suitably cracked with the least possible damage to the nut meat, thus facilitating the ready removal of the meat in whole or halves, e.g., in the case of pecans or the like.

The apparatus of the present invention improves over prior art devices by providing automatic compensation for the variation in size of nuts while retaining provision for cracking each nut a predetermined amount, thus avoiding the problems of over-cracking and under-cracking. The arrangement permits easier and quicker controlled cracking of nuts of random size and, consequently, enhances the profitability of commercial nut-cracking operations.

One continuous forward stroke of the drive crank or lever causes all necessary functions to be simply and readily performed with a minimum of attention and effort on the part of the operator. The reverse stroke of the crank rapidly clears the jaws for the next cracking operation. Thus, it may be appreciated, that the present invention simplifies the nut-cracking procedure by providing a linear cracking take-up including a novel positive drive portion for effecting reliable shell cracking.

It is accordingly an object of the present invention to provide an improved nut-cracking device capable of automatic compensation for the variation in nut sizes while permitting a predetermined cracking pressure to be applied to each nut.

A further object is the provision of simple, and therefore, relatively inexpensive nut-cracking apparatus of durable construction.

Further objects include the provision of such an apparatus requiring relatively small amount of manual force to crack a nut shell.

A still further object is a provision of a nut-cracking apparatus having an automatic adjustable nut-gripping and holding arrangement capable of receiving increased pressure to crack the shell of a so-gripped nut.

With the foregoing objects in mind, the invention will now be described in the light of the accompanying drawings which will enable those skilled in the art to appreciate the many features and other objects of apparatus in accordance with the invention.

In the drawing:

FIG. 1 is a plan view of a nutcracker fabricated in accordance with the teachings of the present invention;

FIG. 2 is a view in side elevation of the nutcracker assembly of FIG. 1;

FIG. 3 shows a portion of the apparatus of FIGS. 1 and 2 in its nut-receiving condition, part of the structure being broken away more clearly to reveal certain internal features of construction;

FIG. 4 shows the apparatus of FIG. 3 in the nut-gripping condition;

FIG. 5 shows the apparatus of FIGS. 3 and 4 in the nutcracking condition;

FIG. 6 is a detailed view of a construction feature taken along the plane 6—6 of FIG. 1 and looking in the direction of the arrows thereof;

FIG. 7 is a view similar to FIG. 6 showing further construction details, this view being taken along the plane 7—7 of FIG. 1 and looking in the direction of the arrows thereof;

FIG. 8 is a further detailed showing of structure similar to FIG. 7 but taken along the plane 8—8 of FIG. 1 and looking in the direction of the arrows thereof;

FIG. 9 is a fragmentary view of a portion of the internal structure of the cracking device; and FIG. 10 is a further internal construction view, generally revealing the structure of FIG. 9 oriented 90° in a clockwise direction from the showing of FIG. 9.

Considering now FIGS. 1 and 2 of the drawing, the supporting structure or base 11 is provided with the usual feet or pads 13 and may be of any rigid material such as wood or metal. A casting or housing 15 forms a part of the overall frame and is secured to the base 11 by the bolts or screws 17 to provide a rigid supporting structure for the mechanism to be described.

The nutcracker mechanism comprises a jaw 19 (FIG. 3) fixed to the housing 15 and having a nut-receiving socket 21 in alignment with a movable jaw 23 having a mating nut-receiving socket 25 (FIG. 2). A driving mechanism, in the form of the elongated manually operated shaft 27, is provided to move the jaw 23 toward and away from the jaw 19.

The manually operated lever 27, pictured as having a curved tip 27' (to conserve space) is first moved in a clockwise direction, causing the apparatus, as viewed in FIG. 2, to open the jaw 23 relative to the jaw 19. Movement of the lever or shaft 27 to the right causes the elongated shaft member 31 to move to the left, thereby opening the jaws in a linear motion. This is effected through the linkage 33 of the bell crank type which is pivotally mounted on spindle 35 supported for rotation by housing 15. The lower end of link 33 is connected to one end of a hollow sleeve 39 by way of spindle 41. (FIG. 6). The other end of the sleeve 39 bears against a projection 43 (FIG. 8) rigidly affixed to a connecting link 45 extending from jaw 23 on shaft 31.

Thus, the opening drive engagement between lever 27 and shaft 31 is via the link 33, rigid sleeve 39 and connecting link 45. Thus, even a small amount of force applied to lever 27 in a clockwise direction will cause the bell crank 33 to move the sleeve 39 to the left (as viewed in FIG. 2) thereby opening jaw 23 from jaw 19.

From a consideration of FIGS. 3 through 5, it will be appreciated that the nut 51 is placed between the jaws 19 and 23 which, in reality, may be opened much further than is apparent from FIG. 3. The illustrative hand 53 is shown locating the nut 51 between the nut-accommodating sockets 21 and 25. Gripping of the nut 51 is effected by movement of the lever 27 (FIG. 2) to the left or in a counterclockwise direction. This causes bell crank 33 to be rotated to the right to tension a resilient means, shown as the spring 37 (FIGS. 4 and 5), attached between projection 43 and spindle 41. Further pressure on the lever 27 causes the spring 37 to expand, thereby imparting a tensioning movement to shaft 31 causing the retaining socket 25 of jaw 23 to close on the nut 51 and effect gripping thereof but the spring tension is insufficient to crack the shell.

At a predetermined point in the cracking cycle, the operative end 27' of member 27 is caused to engage friction plates 53 rather snuggly fitted on shaft 31, as is best seen in FIGS. 9 and 10, thereby affording a positive drive portion of the closing and cracking stroke.

It should be pointed out at this time that the longitudinal member 31, which is provided to move the movable jaw 25 into operative relation with the fixed jaw 19, is positioned on edge to present a greater effective surface area to the multiple friction plates 53. As is apparent from FIGS. 9 and 10, the multiple plates 53 grip the shaft 31 as they are canted by the pressure of the drive member 27 when its tip 27' engages the plates 53 near the extreme end of the cracking stroke or cycle.

As may be seen in FIG. 9, the friction plates 53 are positioned by a spring 61 which bears against the right-hand wall of the housing 15 and urges the plates to their left-hand position. The plates 53 are positively located by the rods 63 rigidly set in the housing 15 such that their location on shaft 31 permits engagement by the operable drive shaft 27 only near or at its extreme right-hand position. As a matter of fact, the usual displacement necessary to crush a nut after it is firmly gripped is of the order of 3/16 to 1/4" movement of shaft 31. Thus it is only necessary that shaft 27 engage the friction plates 53 at a point in the cracking cycle to permit such a small displacement. Also, this cracking displacement can be limited by the cracking adjustment screw 71 equipped with a cracking adjustment screw lock nut 73 for controlling the magnitude of cracking movement.

Certain adjustable features of the invention will now be explained. The resilient driving spring 37 is adapted to be located by spindle 41 at any one of a plurality of slots, depicted at 78 in FIG. 2, to establish the extent of the opening of jaws 19 and 23 to accommodate various size nuts. The left end of spring 37 is shown wrapped in the annular groove 93 of projection 43 (FIG. 6) and the right end around spindle 41 in FIG. 7. Between the spring adjustment and the adjustment of cracking screw 71, as well as, the positioning of the friction plates 53 along shaft 31, full control of the gripping and cracking operation of the apparatus is settable by the operator. A limit stop retaining ring 95 (FIG. 2) is provided on the right end of shaft 31 to prevent overthrow on the opening stroke in the event of wide adjustment.

Having now described the invention, what is claimed is:

1. A nut-cracking device comprising, in combination, a frame, a nut-accommodating jaw affixed to said frame; a shaft slidably mounted on the frame for longitudinal movement relative to the jaw; a second jaw carried by said shaft for cooperating with the first jaw to grip and crack a nut; a forward and reverse stroke driving lever; an expansible link connected between the shaft and the lever for imparting gripping action to the jaws to grip various size nuts; shaft gripping means normally fixedly supported by the frame, said gripping means adapted to grip said shaft by direct engagement with the stroking lever as it is driven further forward to positively connect it to the shaft for cracking pressure, and a rigid connection between said lever and shaft for the portion of the reverse stroke corresponding to the gripping portion of the forward stroke to open the jaws.

2. In a nut-cracking apparatus of the type having opposed closeable nut-gripping and cracking jaws, a single driving mechanism for effecting nut-gripping and nut-cracking, comprising a longitudinal member for carrying one of the jaws for movement toward and away from the other jaw; a drive stroking member moveable in one direction to close the jaws and in the reverse direction to open the jaws; a resilient driving connection between said driving member and said longitudinal member for imparting nut-gripping drive to the jaws via the longitudinal member from the driving member; and means for establishing a rigid driving connection from the driving member to the longitudinal member near the end of the forward stroke to apply cracking pressure to any gripped nut said last mentioned means comprising means encircling the longitudinal member and fixed relative thereto, and a contacting means carried by the driving member for contacting and tilting the encircling means for gripping the longitudinal member thereby applying said cracking pressure.

3. In a nut-cracking apparatus of the type having opposed closeable nut-gripping and cracking jaws a single driving mechanism for effecting nut-gripping and nut-cracking, comprising a longitudinal member for carrying one of the jaws for movement toward and away from the other jaw; a drive stroking member moveable in one direction to close the jaws and in the reverse direction to open the jaws; a resilient driving connection between said driving member and said longitudinal member for imparting nut-gripping drive to the jaws via the longitudinal member from the driving member; and means in the path of the drive member for establishing a rigid driving connection from the driving member to the longitudinal member near the end of the forward stroke to apply cracking pressure to any gripped nut; said last mentioned means including a plurality of friction plates slidably positioned relative to the longitudinal member, and an extension carried by the driving member adapted to tilt the friction plates to establish said rigid driving connection, and, a rigid connection between the drive member and the longitudinal member to cause at least partial movement in the reverse direction to open the jaws.

4. A nut-cracking machine comprising a frame having a fixed nut-gripping jaw; a cracking shaft slidably mounted in said frame; a moveable nut-gripping jaw carried by said cracking shaft; an operating handle pivotally mounted on said frame; an extension carried by said handle; means including a spring, operatively connecting said extension with said moveable nut-gripping jaw; a one-way clutch in the form of a plurality of rings on said cracking shaft; and fixed to the frame against slidable movement of the shaft and an extension carried by said operating handle for causing said clutch to grip the cracking shaft by tilting said rings to move the gripping jaw carried thereby to crack the nut; and adjustable rigid means disposed between the frame and the operating handle to limit movement of the handle in the cracking direction.

References Cited in the file of this patent
UNITED STATES PATENTS

| | | |
|---|---|---|
| 1,922,515 | Wood | Aug. 15, 1933 |
| 2,224,415 | Tonn | Dec. 10, 1940 |
| 2,267,499 | Freidag | Dec. 23, 1941 |
| 2,695,642 | White | Nov. 30, 1954 |